455-600     EX     Examiner
OR    1,379,166
Lloyd British 132,341 Acc Sept 10, 1919
French 499,912,
Canadian 202,164.
T. W. CASE.
RADIANT ENERGY SIGNALING SYSTEM.
APPLICATION FILED JAN. 22, 1918.
1,379,166.          Patented May 24, 1921.
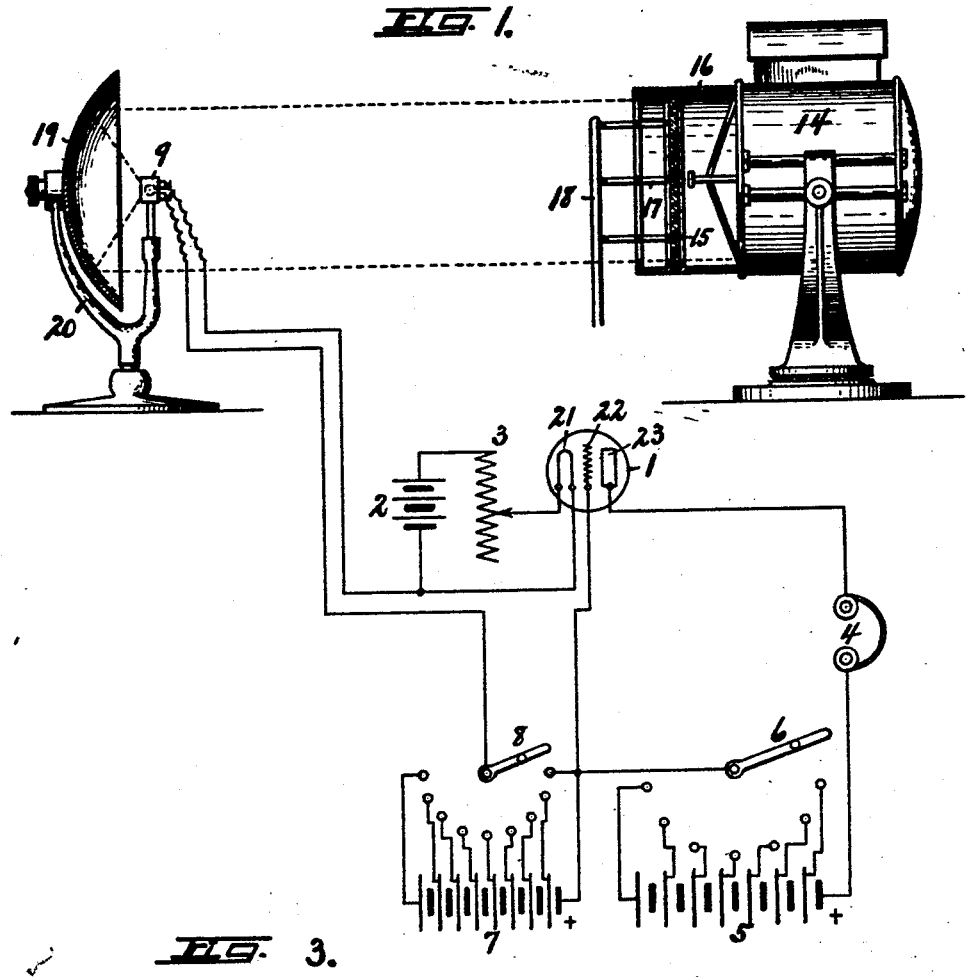
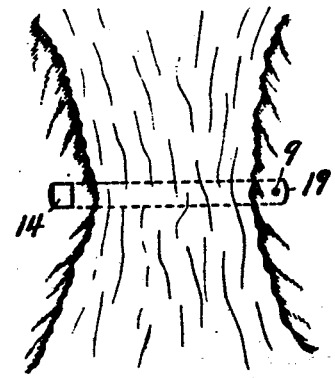
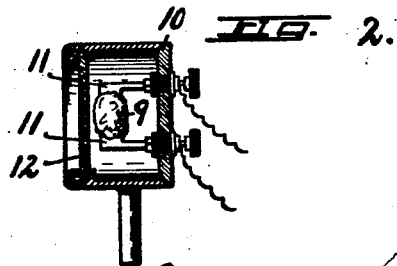
INVENTOR
Theodore W. Case
BY
Dennison Thompson
ATTORNEYS
1 oscillates at audible frequency. The pitch changes when the signal comes in.
9 is compound of thallium and sulfur for infra red rays,
or compound of iodine and sulfur for ultra violet rays.

UNITED STATES PATENT OFFICE.

THEODORE WILLARD CASE, OF SCIPIO, NEW YORK.

RADIANT-ENERGY SIGNALING SYSTEM.

1,379,166.   Specification of Letters Patent.   Patented May 24, 1921.

Application filed January 22, 1918. Serial No. 213,225.

*To all whom it may concern:*

Be it known that I, THEODORE W. CASE, a citizen of the United States, and resident of Scipio, in the county of Cayuga, in the State of New York, have invented new and useful Improvements in Radiant-Energy Signaling Systems, of which the following, taken in connection with the accompanying drawings, is a full, clear, and exact description.

This invention relates to certain new and useful signaling systems and apparatus for carrying out the same.

One of the principal objects of the invention is to utilize light waves emitted from a suitable source to vary a local current in accordance with variation in the light waves produced at the sending station and of such character that an indicating instrument can respond to such variations.

Another object is to provide a novel and highly sensitive system for detecting light rays, both visible and invisible, and translating said rays into signals of an audible or other character.

Another object is to provide a receiving set responsive to invisible light rays so that signaling may be carried on without possibility of detection except by instruments particularly designed for detecting and translating variations, in the particular character of light rays utilized.

Another object is to produce a sending apparatus adapted for selectively transmitting light rays of any character and in regular alternate or intermittent order, as desired.

Other objects and advantages will appear from the following description, taken in connection with the accompanying drawings, in which—

Figure 1 is a partly diagrammatic view of the apparatus.

Fig. 2 is a fragmentary sectional detail of one form of light sensitive device.

Fig. 3 is a view illustrative of my system of detection as applied to a harbor.

In my system, I employ transmitting means for sending light rays and receiving means comprising a light responsive device for detecting the incoming light rays producing an audible or other signal, of a character determined by the light rays transmitted. It is important in systems of this character that as strong a signal as possible be produced so that the effective range of the system will be large.

I have discovered that a pulsation generator may be controlled by the light responsive device and may in turn control an indicating instrument to produce a strong response in the latter on slight change in impedance of the light responsive device. While other forms of hook-ups of the pulsation generator may be employed, I prefer to use the form of connection shown in Fig. 1, which form of connection is deemed new and novel independently of its application to the particular system and apparatus claimed herein, and is independently claimed in a copending application Ser. No. 213.226 filed of even date herewith.

The pulsation generator comprises a vacuum tube or bulb —1— containing a filament —21—, grid —22— and plate —23—, the filament being provided, as shown, with a battery or other source of E. M. F. —2—, preferably connected in series with a rheostat —3—. The indicating device may assume the form of receivers —4— preferably of a large number of turns, connected in series with the battery —5— across the grid —22— and plate —23—. Preferably the voltage of the battery —5— should be adjustable so that the potential across the grid and plate may be varied, and for this purpose I have provided a multi-point switch —6— tapped in at various points of the battery. A similar battery —7— and switch —8— may be provided in series with the light responsive device —9— across the filament —21— and grid —22— permitting regulation of the potential across the filament and grid.

The degree of vacuum in the bulb should be regulated in accordance with the filament temperature and the potential applied to the circuits so that a note of musical frequency may thereby be produced in the telephone or other receiver upon variations in effective resistance of the light responsive device —9—.

I have found that with the connections above described a change in the intensity of light rays impinging on the device —9— produces a marked change in the pitch of the note in the receivers —4—. I now believe the theory of operation to be as follows: A change in the intensity of light rays impinging on the light responsive device —9— produces a change in the impedance of the latter and consequently a change in frequency in the pulsating circuit of the pulsation generator, which circuit includes receivers —4—. This change in frequency of the current through said receivers produces a change in pitch of the note of the latter.

Various types of substances, such as selenium, etc., may be employed as the light responsive device or in the light reactive cell. I prefer, however, for the purposes of secrecy, to use a substance particularly sensitive to the invisible rays of the spectrum, such substances being disclosed in my Patents Nos. 1,301,227 of April 22, 1919, and 1,309,181 of July 8, 1919. As disclosed in the last-mentioned patents, a compound of thallium and sulfur is particularly sensitive in the infra red region of the spectrum, while a compound of thallium and iodin is particularly sensitive in the ultra violet region, but due to the greater wave length, I prefer to use the infra red region of the spectrum as its transmission is very much greater than visible light or ultra violet rays in atmosphere. By using one or the other of these materials, signals may be sent and received without detection by the naked eye or ordinary optical instruments.

Any suitable mounting may be utilized for the light responsive device. Thus in Fig. 2, I have shown the sensitive element —9— supported by a pair of posts —11— of gold or other metal, secured to but insulated from a casing —10—. A water-tight glass cover-plate —12— may be provided for the casing.

The sending means comprises a source of illumination, preferably including a screen for transmitting only invisible rays, and means for interrupting and establishing the illumination at will. The source of illumination may be an ordinary incandescent bulb or any other source of light, or may assume the form of a universally mounted, high intensity searchlight —14— capable of casting a beam of substantially parallel rays, dependent upon conditions and the distance signals should be sent. If it is desired to transmit only the infra red rays, a screen —15— of smoked glass of sufficient thickness to transmit only such rays, or other substance opaque to short wave length light rays, may be employed. The screen —15— may be conveniently located transversely of a drum-shaped extension —16— on the front of the searchlight.

While the beam may be controlled by making and breaking the searchlight circuit, if an electric searchlight is employed, I prefer to use a shutter because of its simplicity and reliability. Thus a shutter —17— of opaque material may be mounted at the front end of the extension —16— and may be opened and closed by means of a rod —18— adapted to be operated either manually or otherwise.

The effectiveness of the light responsive device at the receiving end may be enhanced by the use of a reflector or other light concentrating device —19—, the device —9— being located at the focus of the reflector. The members —9— and —19— may be detachably mounted in a bracket —20—.

From the foregoing description it will be obvious that on operating the shutter —17— at the sending end, the note in the receiver —4— at the receiving end will change in pitch so that a system of Morse or other code signals may be employed for transmitting intelligence from one station to the other. Furthermore, if the screen —15— is employed, it is impossible for any one unequipped with specially designed apparatus to detect the signals or even suspect that signaling is being carried on. The shape of the beam of light used is a question of expediency under different conditions. In sweep signaling it may be desirable to use a beam having a large vertical spread with a minimum lateral spread.

It will be appreciated that my system possesses marked advantages over existing systems of signaling. Thus, assuming that it is employed to signal between friendly ships in war time, as the system may be directive the signals cannot be picked up and read by the enemy unless the latter happens to be located in the line connecting the sending and receiving instruments and then only by special apparatus. Furthermore, by employing the screen —15— there will be nothing visible to betray the fact that signaling is being carried on. The sending means may be noiseless in its operation so that a ship in distress, for example, a torpedoed ship, could signal for help without arousing suspicion on the part of the enemy.

My invention may also be readily employed in harbor defense. Thus the sending means —14— may be located on one side of the harbor (see Fig. 4) in such a position as to send its beam across the inlet as close to the water level as practicable and the receiving means —9—, —19— may be located anywhere in the beam and the translating means may be located at any point desired. Obviously the passage of any object, such as a ship or even a periscope of a submarine through the beam of light would cause a signal to be given at the receiving end. This system of detection is advantageous in that it offers no obstacles or dangers to friendly ships and may be totally invisible to the enemy, thus throwing the latter off his guard.

The vacuum vessel 1 with its three electrodes arranged and connected as described constitutes a pulsation generator, or a pulsation producing device resulting in the production of vibrations of audible frequency in receivers —4—. The operation of this device is distinctly different from the operation of present known devices of similar mechanical structure used in connection with wireless receiving apparatus embodying normally oscillating circuits containing more marked capacities and inductances than the circuits of the apparatus here illustrated. That the operation is distinctly different is clearly demonstrated by the fact that under known formulas no audible note could be produced in receivers —4— with the circuits here shown, whereas notes of perfectly audible frequency are produced.

Further, although the frequency of the circuits shown may be constant under constant conditions, yet such frequency is much more readily changed and varied than in circuits containing more marked capacities and inductances as commonly used in practice. As a result the frequency is readily varied and slight changes in circuit conditions as for instance in impedance are readily detected and translated into variations in pitch of the note produced in the receivers.

In accordance with the provisions of the patent statutes, I have herein described the principle of operation of my invention, together with an apparatus which represents a practical embodiment of the mechanical features thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

What I claim is:

1. In an apparatus of the class described, means for transmitting light rays, a normally pulsating current circuit, and means for varying the frequency of pulsation in said circuit in accordance with said transmitted light rays, and means for translating the pulsating current into audible signals.

2. In combination, means for transmitting light rays, a pulsation generator and means comprising an element, the resistance of which varies in accordance with variations in intensity of the light rays to which it is subjected, for varying the frequency of the pulsations produced by said generator.

3. In combination, means for transmitting light rays, a pulsation generator and means comprising an element, the impedance of which varies on exposure to light rays for varying the frequency of the pulsations produced by such generator.

4. In combination, means for transmitting light rays, a pulsation generator, and means comprising an element, the resistance of which varies in accordance with variations in intensity of the light rays to which it is subjected, for varying the frequency of the pulsations produced by said generator, and an indicating device connected to said generator.

5. In combination, means for transmitting light rays, a pulsation generator and means comprising an element, the impedance of which varies on exposure to light rays for varying the frequency of the pulsations produced by such generator, and an indicating device connected to said generator.

6. In an apparatus of the class described, means for transmitting light rays, a pair of spaced electrodes, a light reactive resistance and a source of potential connected across the electrodes, and means for translating variations in the light reactive resistance as caused by variations in said transmitted rays into signals.

7. In an apparatus of the class described, means for transmitting light rays, a pair of spaced electrodes, a vacuum bulb inclosing said electrodes, a light reactive resistance and a source of potential connected across the electrodes and means for translating variations in the light reactive resistance as caused by variations in said transmitted rays into signals.

8. In combination, means for transmitting light rays, means for producing an audible note, and means responsive to light rays for causing changes in the pitch of said note.

9. In combination, means for transmitting infra-red light rays, an indicating device, means for energizing said indicating device and means comprising an element comprising thallium for varying the energy supplied to said device in accordance with said transmitted rays.

10. In an apparatus of the class described, means for transmitting light rays, a pair of spaced electrodes, means for heating one of the electrodes, an element, the resistance of which varies in accordance with variations in intensity of the light rays to which it is subjected, and a source of potential connected across the electrodes, and means for translating variations in the light reactive resistance, as caused by variations in said transmitted rays into signals.

11. The method of wireless signaling utilizing a pulsating current circuit which comprises transmitting light rays causing said transmitted light rays to vary the frequency of pulsation in said circuit in accordance with variations in intensity of said transmitted rays, and translating the pulsations into audible signals.

12. The method of signaling with radiant energy by the use of a pulsating current circuit consisting in transmitting light rays, varying the resistance of the pulsating current circuit in accordance with variations in said transmitted light rays, and thereby varying the frequency of pulsation in said circuit and translating such pulsating current into signals.

13. In an apparatus of the class described, means for transmitting light rays, a pair of spaced electrodes, a vacuum bulb inclosing said electrodes, means for heating one of the electrodes, an element, the resistance of which varies in accordance with variations in intensity of the light rays to which it is subjected, and a source of potential connected across the electrodes, and means for translating variations in the light reactive resistance, as caused by variations in said transmitted rays into signals.

14. In combination, means for transmitting light rays and means for receiving said light rays for giving a signal in response to said transmitted rays, comprising an audionic device, a circuit connection between the filament and grid of said audionic device, said connection including a source of potential and an element which changes its resistance under the influence of light, a circuit connection between the grid and plate of said audionic device, said last named circuit connection including a source of potential and a translating device.

15. In a signaling apparatus, means for transmitting light rays, a pulsating current circuit including a pair of spaced electrodes, a light reactive resistance and a source of potential, said elements so correlated that variations of resistance in said circuit as effected by variations in the transmitted light rays to which said light reactive resistance is exposed effects a variation in said pulsating current and means for translating said pulsations into signals.

16. In an apparatus of the class described, means for transmitting light rays, means for receiving said light rays and for giving a signal in response thereto, comprising an audionic device, a circuit connection between the filament and grid of said audionic device, said connection including a source of potential, and an element which changes its resistance under the influence of light, a circuit connection between the grid and plate of said audionic device, said last named connection including a translating device.

17. The method of detecting the passage of an object between two points by the use of a pulsating current circuit, which comprises casting light rays from one of said points to the other point, causing variations of said light rays as received at said other point to vary the frequency of pulsation in said circuit and translating such pulsations into signals.

18. The method of wireless signaling, utilizing a pulsating current circuit which comprises transmitting light rays, causing said transmitted light rays to vary the pulsating current flowing in said circuit in accordance with variations in said rays and translating the pulsating current into signals.

19. The method of signaling with radiant energy by the use of a pulsating current circuit which comprises transmitting light rays, varying the resistance of the said circuit in accordance with variations in said transmitted rays, and thereby varying the pulsating current flowing in said circuit, and translating such pulsating current into signals.

20. In an apparatus of the class described, means for transmitting light rays, a pulsating current circuit, including a pair of spaced electrodes, a source of potential and a light reactive resistance adapted for exposure to said transmitted rays, and means for amplifying variations of the pulsating current flowing in said circuit as effected by variations in said light reactive resistance, and means for translating the resultant current into signals.

21. In an apparatus of the class described, means for transmitting light rays, a pulsating current circuit including a pair of spaced electrodes, a source of potential, a light reactive resistance and a translating device and a third electrode disposed between the two first named electrodes and connected into said circuit.

22. A signaling system comprising a light sensitive cell, a source of current, and means whereby variations of light intensity falling on said cell are recognized as variations in pitch of a musical tone.

23. In a signaling system, an electroionic discharge device, a source of direct current, a light sensitive cell adapted to determine the current supplied to said electroionic discharge device in circuit with the hot filament and grid thereof, and means for recognizing the effect of such current in circuit with the grid and plate of said electroionic discharge device.

24. In an apparatus of the class described a pulsation generator, means comprising an element the impedance of which varies on exposure to light rays for varying the frequency of the pulsations produced by such generator.

25. In an apparatus of the class described, means for producing an audible note, and means responsive to light rays for causing changes in the pitch of said note.

26. In an apparatus of the class described, an audionic device, a circuit connection between the filament and grid of said audionic device, said connection including a source of potential and an element which varies its resistance under the influence of light, a circuit connection between the plate and grid of said audionic device, said last named connection including a translating device.

27. In an apparatus of the class described, a normally pulsating current circuit, including a pair of spaced electrodes, an element, the resistance of which varies in accordance with variations in intensity of the light rays to which it is subjected, and a source of potential, said elements being so correlated that variations of resistance in said circuit as affected by variations in the resistance of said elements cause variations in the frequency of pulsation of said circuit, and means for translating said pulsations into audible signals.

28. In an apparatus of the class described, a vacuum vessel, a filament and a plate inclosed within the vessel, a grid positioned between the filament and plate, means for heating the filament, means for connecting the filament and grid embodying a source of potential and an element, the resistance of which varies in accordance with variations in intensity of the light rays to which it is subjected, a circuit connecting the grid and plate and embodying a source of potential and a translating device.

In witness whereof I have hereunto set my hand this 4th day of January, 1918.

THEODORE WILLARD CASE.

Witnesses:
JOHN M. BRAINARD,
E. M. STEVENSON.

| | | |
|---|---|---|
| Bell | 235,199 | 250-7 |
| Zickler | 625,823 | 250-11 |
| Hayes et al | 654,630 | 250-7 |
| Pierce | 1,112,549 | 179-171 |
| Fuller | 1,149,122 | 250-1 |
| Moffett | 1,087,966 | " |
| Deforest et al | 1,170,881 | 250-8 |
| De Forest | 1,221,035 | " |
| " (British) | 100,358 | 250-2 |
| Von Arco ( ") | 252/14 | 250-36 |
| Langmuir | 1,273,637 | 250-27 |
| Schultz | 801,049 | (Sel. Dig.) 246-29 |
| Fessenden | 1,133,435 | 179-171 |
| Wireless Telephony by Ruhmer, page 76 | | |
| Radiodynamics by B. F. Miessner | Chap 7 | |